(12) United States Patent
Beskales et al.

(10) Patent No.: US 12,242,982 B1
(45) Date of Patent: *Mar. 4, 2025

(54) METHOD OF USING CLUSTERS TO TRAIN SUPERVISED ENTITY RESOLUTION IN BIG DATA

(71) Applicant: Tamr, Inc., Cambridge, MA (US)

(72) Inventors: George Anwar Dany Beskales, Waltham, MA (US); Pedro Giesemann Cattori, Cambridge, MA (US); Alexandra V. Batchelor, Cambridge, MA (US); Brian A. Long, Somerville, MA (US); Nikolaus Bates-Haus, Littleton, MA (US)

(73) Assignee: TAMR, INC., Cambridge, MA (US)

( * ) Notice: Subject to any disclaimer, the term of this patent is extended or adjusted under 35 U.S.C. 154(b) by 923 days.

This patent is subject to a terminal disclaimer.

(21) Appl. No.: 17/358,766

(22) Filed: Jun. 25, 2021

Related U.S. Application Data

(63) Continuation of application No. 17/196,558, filed on Mar. 9, 2021, now Pat. No. 11,049,028.

(51) Int. Cl.
*G06N 20/00* (2019.01)
*G06F 16/28* (2019.01)
*G06N 5/04* (2023.01)

(52) U.S. Cl.
CPC ............ *G06N 5/04* (2013.01); *G06F 16/285* (2019.01); *G06N 20/00* (2019.01)

(58) Field of Classification Search
None
See application file for complete search history.

(56) References Cited

U.S. PATENT DOCUMENTS

| | | |
|---|---|---|
| 10,803,105 B1 | 10/2020 | Beskales et al. |
| 10,929,348 B2 | 2/2021 | Bates-Haus et al. |
| 2018/0350120 A1 | 12/2018 | Thomson et al. |

*Primary Examiner* — David R Vincent
(74) *Attorney, Agent, or Firm* — Panitch Schwarze Belisario & Nadel LLP (57) ABSTRACT

Record clustering is performed by learning from verified clusters which are used as the source of training data in a deduplication workflow utilizing supervised machine learning.

20 Claims, 4 Drawing Sheets

ERD of datasets used in learning from clusters

Figure 4
User Interface Display for Cluster Verification

METHOD OF USING CLUSTERS TO TRAIN SUPERVISED ENTITY RESOLUTION IN BIG DATA

CROSS-REFERENCE TO RELATED APPLICATIONS

This application is a continuation of copending U.S. application Ser. No. 17/196,558 filed Mar. 9, 2021, which is incorporated by reference herein.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

In the domain of data deduplication, deduplication of large-scale data (millions to billions of records) can be performed using machine learning. Previous efforts have shown how supervised machine learning can be trained using a training dataset composed of labeled positive and negative examples. One of the challenges in these workflows is that subject matter experts are best able to judge the accuracy of results when presented with entire clusters, but the machine learning training method requires labeled pairs. Conversely, naively deriving pair-wise training labels from clusters that have been verified by subject matter experts leads to biased training and therefore an inaccurate machine learning system. It would be desirable to provide systems and methods that do not suffer from such disadvantages. The present invention fulfills such a need.

BRIEF SUMMARY OF THE INVENTION

Preferred embodiments of the present invention provide a method and system that are able to learn effectively from verified clusters and rapidly converge on high-accuracy deduplication while learning solely from verified clusters, or from a combination of verified clusters and other training pairs. This has multiple benefits, as follows:
1. Subject matter experts report an easier experience working with a cluster-based verification interface.
2. High model accuracy is achieved with many fewer verified clusters than verified pairs.
3. Training from verified clusters avoids the possibility of contradictory training labels that is present when working with training pairs.
4. At times only cluster information is available, e.g., from another system, and learning from clusters provides a means to train a system from the cluster output of another system.
5. Management and maintenance of verified clusters is a normal part of a production deduplication workflow, so having the ability to learn from clusters eliminates a separate workflow for building or maintaining training labels.

In the present invention, "verified clusters" are used as the source of training data, or as one source of training data in conjunction with other sources of training data, in a deduplication workflow utilizing supervised machine learning.

BRIEF DESCRIPTION OF THE DRAWINGS

Preferred embodiments of the present invention will now be described by way of example with reference to the accompanying drawings.

DETAILED DESCRIPTION OF THE INVENTION

Certain terminology is used herein for convenience only and is not to be taken as a limitation on the present invention. The words "a" and "an", as used in the claims and in the corresponding portions of the specification, mean "at least one."

This patent application includes an Appendix having a file named appendix689422-13U1.txt, created on Jun. 17, 2021 and having a size of 5,297 bytes. The Appendix is incorporated by reference into the present patent application. One preferred embodiment of the present invention is implemented via the source code in the Appendix. The Appendix is subject to the "Copyright Notice and Authorization" stated above.

The Appendix includes the following parts of software code:
Part 1: A representative example of pseudocode to create inferred MATCH labels, sampling at most N records and at most K pairs.
Part 2: A representative example of pseudocode to create inferred NON_MATCH labels, sampling at most N records and at most K pairs.

I. TERMINOLOGY AND DEFINITIONS

The following terminology and definitions are provided to promote understanding of the present invention. The terminology and definitions of the prior art are not necessarily consistent with the terminology and definitions of the present invention. Where there is conflict, the following terminology and definitions apply.

Current cluster membership (current cluster): A record with a current cluster membership. A current cluster membership may also be marked as verified, indicating that the current cluster membership is also the verified cluster membership for the record.

Proposed cluster membership (proposed cluster): A record with a proposed cluster membership.

Verified cluster membership (verified cluster): A record with a current cluster membership that is also marked as verified. A verified cluster membership may also have a mode, one of locked, suggest, or movable.

Cluster with verified members: a cluster such that there exists at least one record with that cluster as its verified cluster membership.

Pair-wise classifier (model): a method to predict classes of record pairs, given training data.

II. DETAILED DISCLOSURE

1. Workflow for Record Deduplication with Supervised Machine Learning

Figure 1:
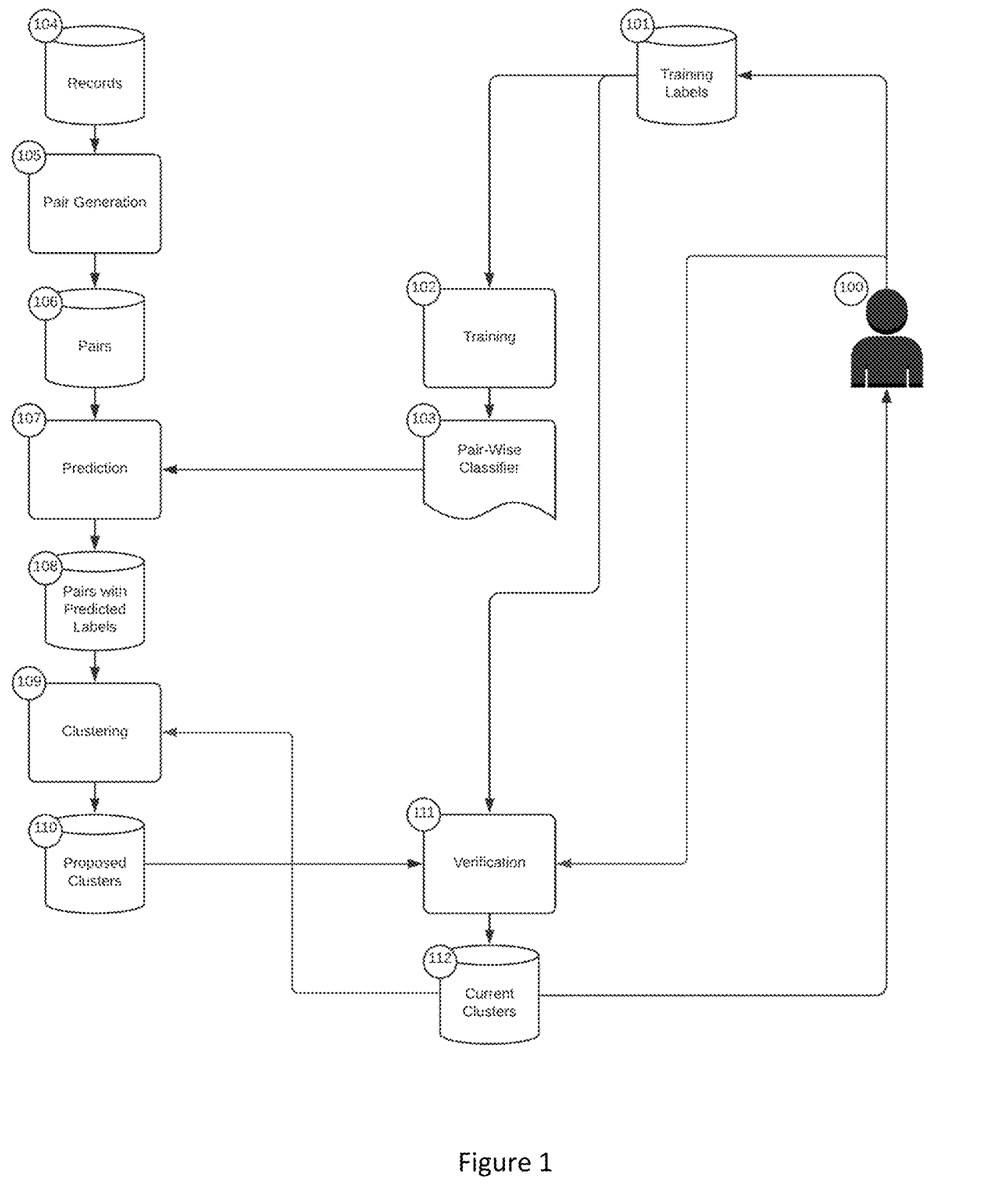
FIG. 1 is a flowchart for record deduplication with supervised machine learning and cluster verification, in accordance with one preferred embodiment of the present invention.

FIG. 1 is a flowchart for record deduplication with supervised machine learning and cluster verification, in accordance with one preferred embodiment of the present invention. The process illustrated in FIG. 1 operates as follows:

1. An operator (100) provides training labels (101), consisting of pairs of records with MATCH or NON_MATCH labels.
2. The training labels (101) are used to train (102) a pair-wise classifier (103) that will predict whether an input pair should have a MATCH or NON_MATCH label, with a similarity score.
3. A collection of records (104) is turned into a collection of pairs with signals (106) by pair generation (105).
4. Prediction (107) is performed by applying the pair-wise classifier (103) to each of the pairs with signals (106) and predicting, for each of the pairs with signals, a label of MATCH or NON_MATCH, with a similarity score, thereby producing pairs with predicted labels (108).
5. Clustering (109) is then done on the pairs with predicted labels (108). If there are current clusters that include verified clusters (112), the verified clusters are incorporated into clustering. The result is proposed clusters (110).
6. Verification (111) allows the operator (100) to review the proposed clusters, make changes if desired, to verify that clusters are correct, and to save the proposed clusters with the changes and verifications as the current clusters that include verified clusters (112).

There is also a learning cycle to augment the training labels that operates as follows:

1. The operator (100) uses the current clusters that include verified clusters (112) to determine how to adjust and/or augment the training labels (101).
2. The workflow for deduplication with supervised machine learning can be repeated using the adjusted and/or augmented training labels.

Figure 2:
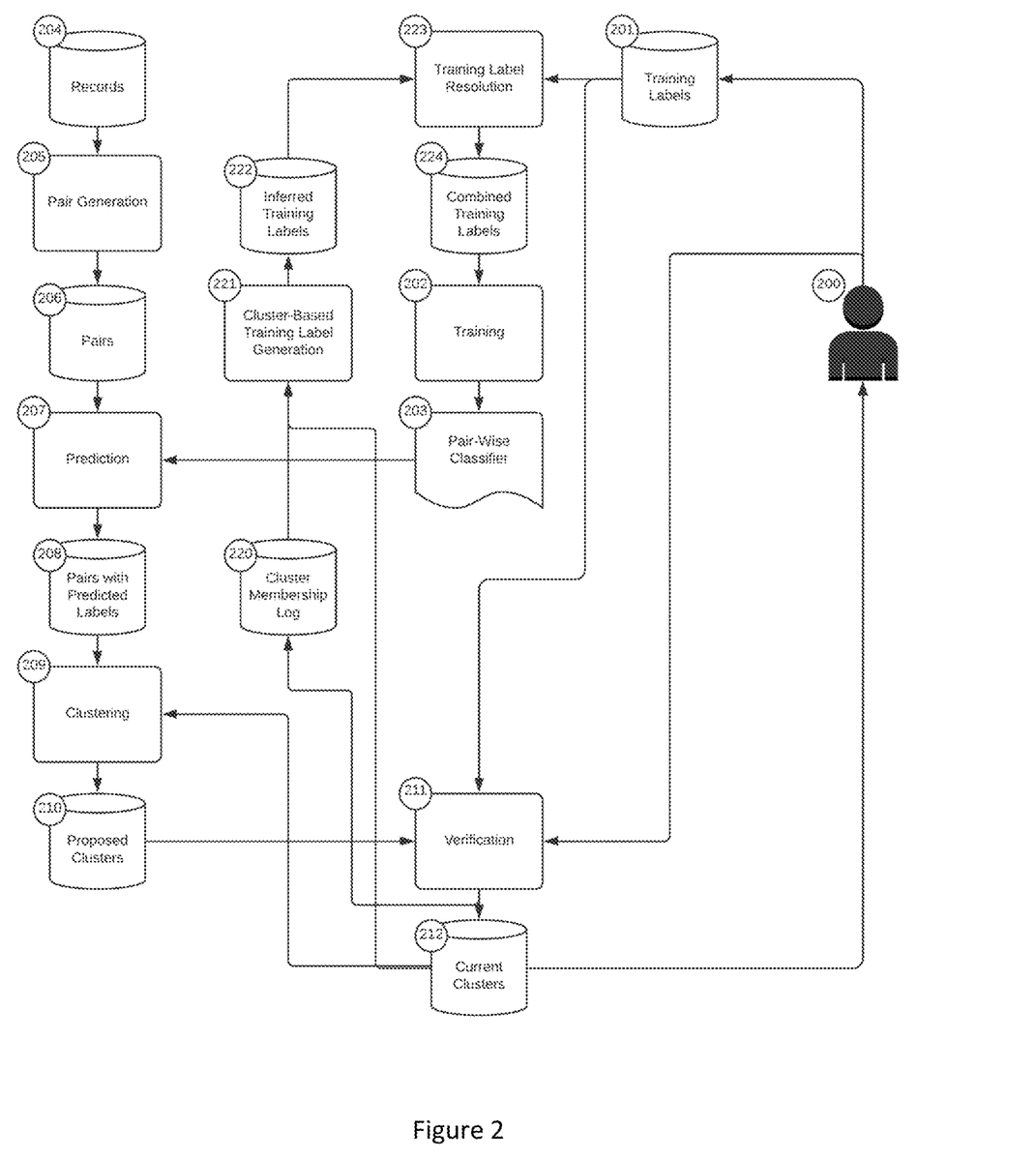
FIG. 2 is a flowchart for record deduplication with supervised machine learning incorporating learning from verified clusters, in accordance with another preferred embodiment of the present invention.

2.2. Workflow for Record Deduplication with Supervised Machine Learning Incorporating Learning from Verified Clusters 2.2.1. Bootstrapping Referring to FIG. 2, there are multiple ways to bootstrap the system:

1. The Operator (200) may provide sufficient training labels (201), and commence with the Training workflow.
2. The Operator (200) may provide proposed clusters (210) from an external system, then proceed with Verification (211) and the workflow to update training labels (201).
3. The Operator (200) may start with a naive pair-wise classifier (a pair-wise classifier that always predicts NON_MATCH, causing every record to be placed in its own cluster), and commence with the Deduplication workflow.

The system is considered to be bootstrapped when there are enough combined training labels (224) to successfully carry out training. The exact number of labels will vary depending on the training method and pair-wise classifier being used. Experimental data shows that using k-fold learning to build a 5-tree random forest, 50 training labels is sufficient to successfully carry out training.

2.2.2. Model Training Workflow

1. An operator (200) provides a possibly empty collection of training labels (201), each label consisting of a pair of records with an associated MATCH or NON_MATCH label.
2. Training Label Resolution (223) combines the training labels (201) with a possibly empty collection of inferred training labels (222), resulting in combined training labels (224).
3. The combined training labels (224) are used to train (202) a pair-wise classifier (203) that will predict whether an input pair should have a MATCH or NON_MATCH label, with a similarity score.

2.2.3. Deduplication Workflow

1. A collection of records (204) is turned into a collection of pairs (206) using a pair generation method (205). 2. Prediction (207) is performed using the pair-wise classifier by applying the pair-wise classifier (203) to each of the pairs (206) and predicting, for each of the pairs with signals, a label of MATCH or NON_MATCH, thereby producing pairs with predicted labels (208).
3. Clustering (209) is then done on the pairs with predicted labels (208) using a clustering algorithm. If there are verified clusters (212), the verified clusters are incorporated into clustering. The result is proposed clusters (210).
4. Verification (211) allows the operator (200) to review the proposed clusters, make changes if desired, to verify that clusters are correct, and to save the result as the current clusters that include verified clusters (212). Any changes to clusters are also recorded in the cluster membership log (220).

2.2.4. Workflow to Update Training Labels

1. The operator (200) uses the current clusters that include verified clusters (112) to determine how to adjust and/or augment the training labels (201).
2. Cluster-based training label generation (221) examines the current clusters (212) and the cluster membership log (220) to create inferred training labels (222). The newly created inferred training labels replace any previous inferred training labels.

2.3. Detailed Description

The detailed description follows the workflow from one set of proposed clusters, through updating the system to generate a new set of proposed clusters.

Proposed Clusters

Within a system for large-scale data curation, a subject matter expert is presented with proposed clusters. The proposed clusters consist of a collection of records wherein each record has a proposed cluster membership ("proposed cluster") provided by the system. Cluster membership is represented by associating a cluster identifier with the records that are members of that cluster. Using universally unique identifiers (UUIDs) for cluster identifiers is convenient from a system programming perspective, but users find it convenient to view cluster membership using another label derived from the cluster, e.g., the most common value of the "name" attribute in all records that are members of the cluster.

The proposed clusters incorporate any verified cluster membership ("verified cluster") from the most recent current clusters, if any. Verified cluster membership consists of a collection of records wherein each record has a verified cluster membership provided by a subject matter expert. Cluster membership is represented by associating a cluster identifier with the records that are members of that cluster. Verified clusters can be represented using the same data structures as proposed clusters, with the addition of information about which subject matter expert provided the verification, and the date and time at which it was provided.

Note that a single record may have both a proposed and a verified cluster membership, and that these memberships may be to the same cluster, or to different clusters.

Example

Proposed clusters for 9 records and 3 clusters. In this case, none of the records had a previous verified cluster.

| record_id | proposed_cluster | verified_cluster | verification_type |
|---|---|---|---|
| 11 | A | | |
| 12 | B | | |
| 13 | A | | |
| 21 | B | | |
| 22 | B | | |
| 23 | B | | |
| 31 | C | | |
| 32 | B | | |
| 33 | C | | |

Verification

Figure 4:
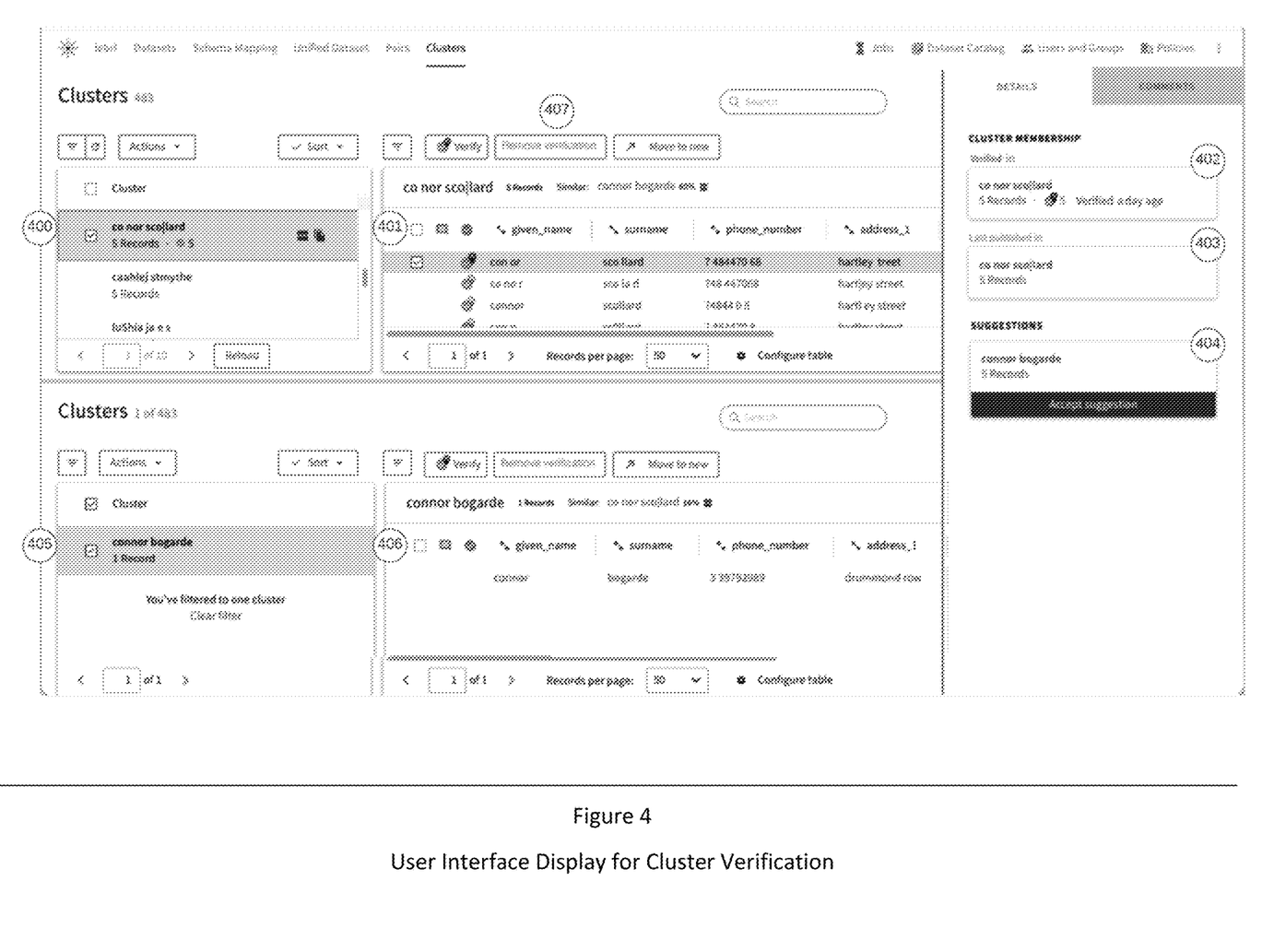
FIG. 4 is a user interface display of records and their respective current, proposed and verified cluster memberships, with controls enabling the user to indicate whether a record is a member of a cluster.

Verification presents the proposed clusters to the operator in a user interface. FIG. 4 provides an example of such a user interface. In this figure, the top pane shows a selected cluster (400) and the records that are currently members of that cluster (401). Each of those records is also a verified member of the cluster, as indicated by the check marks on the record rows. The first record in this list is selected to expose details in the right-hand pane. These details show the current cluster (402), which is also verified, the previous current cluster (403), and a proposed cluster (404) (termed "suggested" in this interface) that is different from the from the current cluster. The bottom pane shows a suggested cluster (405) and the record that is currently a member of that cluster (406). This record is not a verified member of the cluster, as indicated by the absence of a check mark on the record row.

The following actions are available to the operator:
1. Verify that a record is a member of a cluster. This sets the verified cluster for that record. The new verified cluster overrides any previous verified cluster for that record.
2. Remove verified cluster membership from a record.

These actions are represented by the Verify and Remove verification buttons in FIG. 4 (407). In both cases the proposed cluster for the record is unchanged.

The operator may also be presented with actions that are a combination of the above actions. For example, "verifying a proposed cluster" is the same as verifying that each record with the specified cluster as the proposed cluster is a member of the specified cluster. "Merging a cluster into a target cluster" is the same as verifying that each record in the cluster being merged is a member of the target cluster.

Example

Starting with the proposed clusters in the previous example, the operator verifies that record 12 belongs in cluster B, and records 11 and 13 belong in cluster A. The resulting proposed clusters are as follows:

| record_id | proposed_cluster | verified_cluster | verification_type |
|---|---|---|---|
| 11 | A | A | MOVABLE |
| 12 | B | B | MOVABLE |
| 13 | A | A | MOVABLE |
| 21 | B | | |
| 22 | B | | |
| 23 | B | | |
| 31 | C | | |
| 32 | B | | |
| 33 | C | | |

Additional Cluster Verification Actions

When performing cluster verifications, the user can select how the system should handle the verified cluster in the future. Possible options are as follows:
1. Lock the record to its verified cluster. The system will not generate proposed clusters for the record in future iterations. This mode is referred to herein as "LOCK."
2. Suggest proposed clusters for the record in future iterations, but leave the verified cluster as-is. This makes it easy for the user to review proposed clusters against the current verified cluster to determine whether the verified cluster should be changed. This mode is referred to herein as "SUGGEST."
3. Propose clusters for the record, and if the proposed cluster differs from the verified cluster, automatically remove the verified cluster, leaving the proposed cluster as the current cluster. This mode is referred to herein as "MOVABLE."

The user can then select which verification modes should be included in the generation of training data. For example, LOCK is the strongest form of verification and is likely to always be included, whereas MOVABLE is the weakest form of verification and is likely to be omitted from training data generation.

Current Clusters

The operator may at any time save the current state of proposed and verified clusters as the current clusters. The current cluster membership of a record is determined as its verified cluster if such exists with mode LOCK or SUGGEST, otherwise it is the proposed cluster membership. The verification status of a verified cluster remains unchanged with mode LOCK or SUGGEST; the verification status of a verified cluster with mode MOVABLE is removed if the record's new current cluster differs from its previous current cluster.

The current cluster membership is the desired output of the system and can be published for use in other data systems.

Example

Starting with the proposed clusters in the previous section, when the operator saves the proposed clusters, the resulting current clusters will be as follows:

| record_id | cluster_id | verification_type |
|---|---|---|
| 11 | A | MOVABLE |
| 12 | B | MOVABLE |
| 13 | A | MOVABLE |
| 21 | B | |
| 22 | B | |

| record_id | cluster_id | verification_type |
|---|---|---|
| 23 | B | |
| 31 | C | |
| 32 | B | |
| 33 | C | |

Cluster Membership Log

Each time the operator saves the current clusters, the system stores the current cluster membership for all records for which cluster membership has changed since the previous save in the cluster membership log. To show the previous verified cluster membership in the user interface, the system may also store the current cluster membership and verified cluster membership for all records for which verified cluster membership has changed since the previous save in the cluster membership log. The cluster membership log contains the record, its proposed cluster membership, its verified cluster membership (if any), and the version of the current clusters at which this was effective.

Example

The proposed clusters in the previous section were saved as version 2. In the previous version 1, records 11, 12, and 13 had current_cluster A; records 21, 22, and 23 had current cluster B; and records 31, 32, and 33 had current cluster C. No records were verified. At version 2, the cluster membership log would appear as follows:

| version | record_id | cluster_id | verification_type |
|---|---|---|---|
| 1 | 11 | A | |
| 1 | 12 | A | |
| 1 | 13 | A | |
| 1 | 21 | B | |
| 1 | 22 | B | |
| 1 | 23 | B | |
| 1 | 31 | C | |
| 1 | 32 | C | |
| 1 | 33 | C | |
| 2 | 11 | A | MOVABLE |
| 2 | 12 | B | MOVABLE |
| 2 | 13 | A | MOVABLE |
| 2 | 21 | B | |
| 2 | 22 | B | |
| 2 | 23 | B | |
| 2 | 31 | C | |
| 2 | 32 | B | |
| 2 | 33 | C | |

Cluster-Based Training Label Generation

Within the current clusters, for a given record with a verified cluster:
1. The given record forms a "matching pair" with each other record with the same verified cluster. That is, a subject matter expert has indicated to the system that the pairs containing the given record and each other record with the same verified cluster should have the label MATCH.
2. The given record forms a "non-matching pair" with each record with a different verified cluster. That is, a subject matter expert has indicated to the system that the pairs containing the given record and each other record with a different verified cluster should have the label NON_MATCH.

The possible pairs that can be derived from verified clusters in this way is excessive and unbalanced, meaning that there are many more possible pairs than are required for effective training labels, and using all of the pairs as training data will result in a pair-wise classifier with very poor accuracy.

Sampling is therefore used to select training data that is likely to support rapid convergence to a highly accurate model.

Example

For the above current clusters, note that clusters A and B have verified records, whereas cluster C does not. Therefore, the system can infer MATCH labels for clusters A and B, but not for C. Therefore, the inferred MATCH labels would be as follows:

| record1_id | record2_id | label |
|---|---|---|
| 11 | 13 | MATCH |
| 12 | 21 | MATCH |
| 12 | 22 | MATCH |
| 12 | 23 | MATCH |
| 12 | 32 | MATCH |
| 21 | 22 | MATCH |
| 21 | 23 | MATCH |
| 21 | 32 | MATCH |
| 22 | 23 | MATCH |
| 22 | 32 | MATCH |

As discussed above, a representative example of pseudo-code to create inferred MATCH labels is shown in Part 1 of the Appendix.

Non-Trivial Non-Matching Pairs

Based on observations, most non-matching pairs are trivial non-matches. That is, a pair-wise classifier trained on almost any sample of the non-matching pairs will be able to correctly predict that they are non-matches. Preferably, one would want to restrict the sample of non-matches used in training to non-trivial non-matches; that is, non-matches where only a pair-wise classifier trained on appropriate training labels will be able to correctly predict that they are non-matches.

One indication that a non-matching pair is non-trivial is when there is both evidence to support that the records in the pair are in the same cluster and therefore the pair should be labeled MATCH, and evidence to support that the records in the pair are in different clusters and therefore the pair should be labeled NON_MATCH. An example of such conflicting evidence is when two records have the same cluster membership in some previous current clusters in the cluster membership log, but different cluster membership in the current clusters. To eliminate spurious conflicting evidence stemming purely from the probabilistic nature of record deduplication with supervised machine learning, one can further restrict to those pairs where a subject matter expert has examined the cluster membership of at least one record in the pair. Experience shows that restricting to records with verified clusters is too restrictive: under this constraint the system requires excessive cluster verification by subject matter experts in order to generate enough non-matching pairs to generate sufficient training data to converge on a good model. Experiments have shown that restricting to pairs where at least one record is in a cluster with at least one verified member allows the system to generate sufficient non-matching pairs, while still suppressing spurious non-matching pairs arising from the probabilistic nature of record deduplication with supervised machine learning.

Therefore, the non-matching pairs used in training are restricted to these non-trivial non-matching pairs.

One method of identifying non-trivial non-matches is as follows:

For each cluster $c_k$ with at least one verified record in the current clusters, consider all records $a_i$ that currently have verified cluster $c_k$. For each such record $a_i$, consider all records $r_j$ that have a different verified cluster in the current clusters, but where $a_i$ and $r_j$ had the same cluster in some previous current clusters. All pairs of such records $a_i$ and $r_j$ are non-trivial non-matches.

Example

For the above cluster membership log and current clusters, clusters A and B have verified records, whereas cluster C does not. Therefore, the system can infer NON_MATCH labels for clusters A and B but not for C. Furthermore, only records 12 and 32 meet the criteria of currently being a member of a cluster with verified records, and previously being a member of a different cluster, so the system can only infer NON_MATCH labels for these two records. Therefore the inferred NON_MATCH labels would be as follows:

| record1_id | record2_id | Label |
|---|---|---|
| 11 | 12 | NON_MATCH |
| 12 | 13 | NON_MATCH |
| 31 | 32 | NON_MATCH |
| 32 | 33 | NON_MATCH |

As discussed above, a representative example of pseudo-code to create inferred NON_MATCH labels is shown in Part 2 of the Appendix.

Record-Based Sampling

When working with large clusters (clusters having more than 1,000 verified records), computing all matching or all non-matching pairs for the cluster becomes computationally expensive. To limit this computational overhead, one approach is to take a uniform sample of the verified records, and then compute the pairs for the cluster using only the sampled records. Based on experimentation, a sample size of N=1,000 has been found to be effective, yielding at most 499,500 matching pairs per cluster.

When computing non-matching pairs, one approach to limiting computational overhead is to take a uniform sample of the records verified within the cluster, and for each of those, take a uniform sample of the records previously in a different cluster, then compute the non-matching pairs for the cluster using only the sampled records. In experiments, it has been found effective to use the same sample size of N=1,000, yielding at most 499,500 non-matching pairs per cluster.

Pairs Sampling

To ensure that large clusters do not unduly dominate the training data, the number of matching and non-matching pairs is restricted to at most K pairs per cluster. Experimentation has shown that when restricted to fewer than K=5 matching and non-matching pairs per cluster, the system requires a large number of records with verified clusters before it is able to generate enough training data to train a model that yields predicted clusters with acceptable precision and recall. The cost of the subject matter expert's time to generate this number of verified clusters is prohibitive. On the other hand, accepting more than K=20 matching and non-matching pairs per cluster unduly limits the impact of small clusters of only 2 or 3 records. It has been found that using K=10, yielding at most 10 matching pairs and 10 non-matching pairs per cluster, both enables the system to converge quickly on a model that produces accurate predicted clusters, and ensures that the pairs coming from large clusters do not dominate the training data.

To avoid bias when sampling the pairs for a given cluster, one should sample uniformly from all pairs for the cluster.

For matching pairs, this means the following:
 1. For each cluster with at least one verified record in the current clusters, collect all records that share that verified cluster, and select a sample of at most N.
 2. Compute all pairs of those records. This is the Cartesian product of all sampled records that share that verified cluster.
 3. Uniformly sample K matching pairs from all of the pairs so formed.

For non-matching pairs, this means the following:
 1. For each cluster with at least one verified record in the current clusters, collect all records $a_i$ that share that verified cluster, and select a sample of at most N.
 2. For each sampled record $a_i$ with the selected verified cluster, find all records $r_j$ that have a different verified cluster in the current clusters, but where $a_i$ and $r_j$ had the same cluster in a previous current clusters, and select a sample of at most N. Then form the pairs consisting of the sampled $a_i$ and each such sampled $r_j$.
 3. Uniformly sample K non-matching pairs from all of the pairs so formed.

Stable Uniform Sampling

When using sampling to create training data, a uniform random sample should be used to ensure an even distribution across available training data. When using random sampling, there is a chance that the different training data sampled for different rounds of training will be different enough to produce models that perform dramatically differently. One should minimize this chance, even when there are other differences between the training rounds, such as the addition or removal of verified clusters, or the addition or removal of records.

In all situations where sampling is done, it is stabilized across runs by sorting the objects to be sampled by a hash of the object's key and selecting the desired number of objects from the start of the sorted objects. Records are sorted by record id; pairs are sorted by the hash of the ids of the two records, with the lower-valued record id in the pair always coming first; and clusters are sorted by the hash of the cluster id. This ensures that samples are deterministic, the hash ensures that samples are uniform random, and also ensures that changes across runs are evenly distributed throughout the range, so that changes have a chance to be reflected in the training data proportional to the size of the change, but samples are otherwise stable.

Inferred Training Labels

The result of cluster-based training label generation is a collection of inferred training labels, that is, pairs of records with MATCH or NON_MATCH labels that have been inferred from the verified clusters and the log of previous clusters. The number of labels in this collection will be at most 2K times the number of verified clusters (K MATCH labels per cluster, plus K NON_MATCH labels per cluster).

Bootstrapping the system requires enough training labels to support model training. It has been found that using k-fold learning and a random forest with 5 sub-trees, 50 labels (25 match+25 non-match) is enough to bootstrap the system. This requires approximately 3 clusters (more if the clusters are small, e.g., fewer than 4 records for K=10) to be verified.

Generating non-match labels requires at least two different current clusters. An effective method of generating these initial current clusters is to start with a proposed clusters—e.g., from an external system or from a relatively naive pair-wise classifier—that is promoted immediately to a current clusters, then correct and verify the requisite number of clusters and save the result as a new current clusters.

Training Label Resolution

It may occur that the inferred training label for a pair conflicts with the training label provided by the operator for the same pair. In the event of such a conflict, it is assumed that the operator-provided label represents detailed knowledge that the inferred label fails to capture, and therefore one should retain only the operator-provided label in the combined training labels.

Training Workflow

The combined training labels can then be used to train a pair-wise classifier to support the record deduplication workflow.

Deduplication Workflow

The majority of the deduplication workflow proceeds as in the base case. The clustering step of the workflow changes to accommodate verified clusters.

Clustering

When performing clustering, if there are verified clusters available, then clustering needs to take them into consideration.

If there are records with verified clusters with mode LOCKED, then clustering can omit all of the records in LOCKED clusters, since there is no need to propose clusters for those records.

If there are records with verified clusters with mode SUGGEST or mode MOVABLE, then the system should still include those records in clustering, since the proposed clusters will be used. Additionally, records with verified clusters with mode MOVABLE should have their verified status removed in the proposed clusters when the proposed cluster differs from the verified cluster.

3. Entity Relationships

Figure 3:
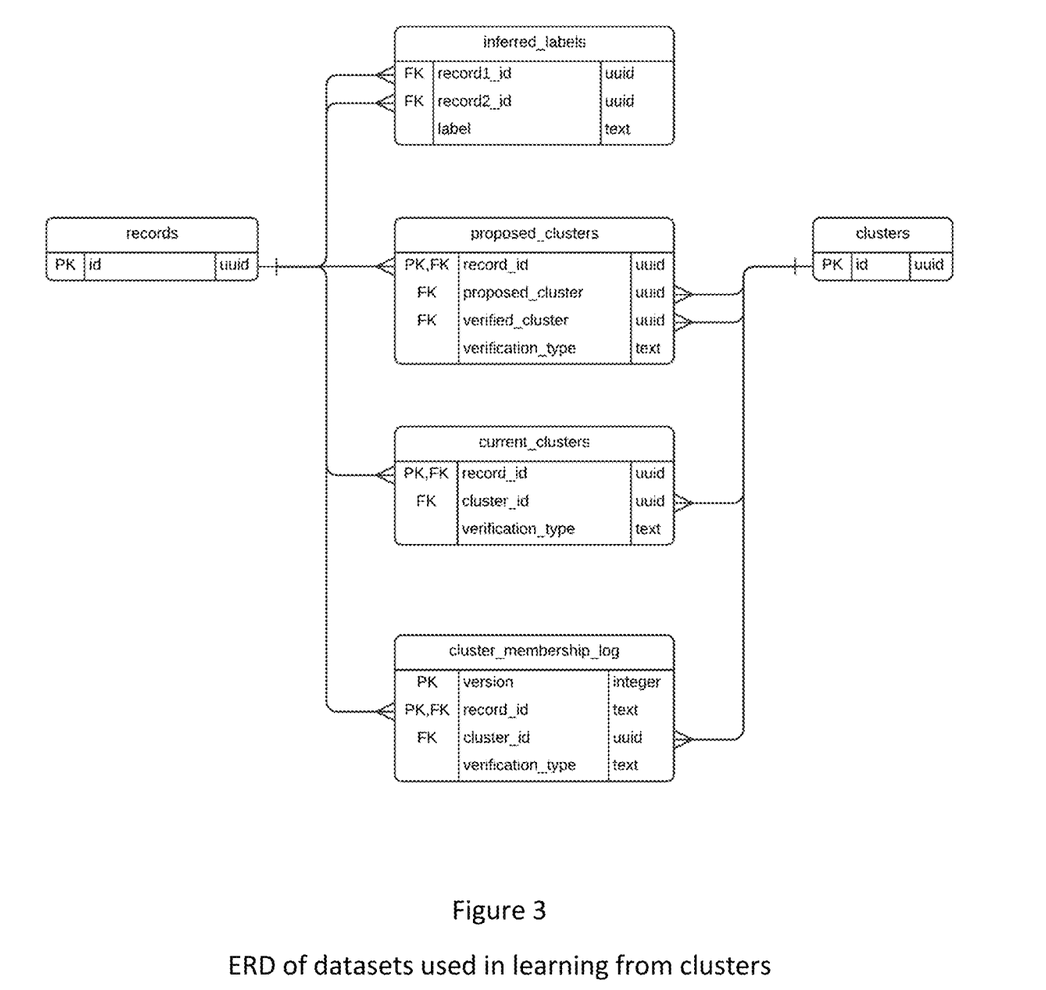
FIG. 3 is an entity relationship diagram (ERD) of datasets used in learning from clusters.

FIG. 3 is a self-explanatory Entity Relationship Diagram (ERD) of datasets used in learning from clusters.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

The scope of the present invention thus further includes a tangible computer program product for record clustering, wherein the computer program product comprises non-transitory computer-readable media encoded with instructions for execution by a processor to perform the methods described above.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method of record clustering comprising:
    (a) providing a collection of records, where each record in the collection has
        (i) a current cluster membership, and
        (ii) a proposed cluster membership,
    in which some of the current cluster memberships may also be verified cluster memberships;
    (b) requesting, via an interface, a subset of the collection of records and their respective current, proposed, and verified cluster memberships;
    (c) indicating, via the interface, for a record in the subset of the collection of records, whether the record is a member of a cluster, thereby resulting in a revised current cluster membership and a revised verified cluster membership for the record;
    (d) storing in memory for each record in the collection of records, the revised current cluster membership and the revised verified cluster membership;
    (e) creating, using software code executing in a processor, inferred match training labels from the revised current cluster memberships and the revised verified cluster memberships, the inferred match training labels including pairs of records from the collection of records, each pair of records having a match label;
    (f) training, using the software code executing in the processor, a pair-wise classifier using the inferred match training labels; and
    (g) generating, using the software code executing in the processor, a new proposed cluster membership for each record in the collection of records using the trained pair-wise classifier and the revised verified cluster memberships, thereby producing a record clustering.

2. The method of claim 1 wherein step (f) further uses training labels provided by an operator.

3. The method of claim 2 wherein the training labels provided by the operator take precedence over the inferred match training labels.

4. The method of claim 1 wherein step (g) is performed by the software code executing in the processor:
    (i) using a pair generation method to transform the collection of records into a collection of pairs of records, and
    (ii) using the trained pair-wise classifier to predict whether each pair of records is a match or non-match, and
    (iii) running a clustering algorithm on the pairs of records with predictions from the pair-wise classifier and the revised verified cluster memberships to generate the proposed cluster membership for each record in the collection of records.

5. The method of claim 1 wherein in step (e), the inferred match training labels are created by examining each cluster with at least one verified member, and for each cluster with at least one verified member,
    (i) selecting a sample of the records whose current cluster membership is the cluster with at least one verified member,
    (ii) forming pairs with match labels from the selected sample of records, and
    (iii) selecting a sample of the formed pairs.

6. The method of claim 1 wherein in step (a) some of the current cluster memberships may also be verified cluster memberships with verification mode, and
    wherein in step (c) indicating, via the interface, for a record in the subset of the collection of records, whether the record is a member of a cluster, and if so, whether the verification mode should be locked, suggested or movable, thereby resulting in a revised current cluster membership and a revised verified cluster membership including verification mode for the record, and
    wherein in step (g) the record clustering is produced by generating, using the software code executing in the processor, a new proposed cluster membership for each record in the collection of records using the trained pair-wise classifier and the revised verified cluster memberships including verification mode.

7. The method of claim 1 wherein in step (b) the interface is a user interface display.

8. A method of record clustering comprising:
    (a) providing a collection of records, where each record in the collection has
        (i) a current cluster membership, and
        (ii) a proposed cluster membership,
    in which some of the current cluster memberships may also be verified cluster memberships;
    (b) requesting, via an interface, a subset of the collection of records and their respective current, proposed, and verified cluster memberships;
    (c) indicating, via the interface, for a record in the subset of the collection of records, whether the record is a member of a cluster, thereby resulting in a revised current cluster membership and a revised verified cluster membership for the record;
    (d) storing in memory for each record in the collection of records:
        (i) the revised current cluster membership and the revised verified cluster membership, and
        (ii) a log of the previous current cluster memberships;
    (e) creating, using software code executing in a processor, inferred non-match training labels from the revised current cluster memberships and the revised verified cluster memberships, and the log of the previous current cluster memberships, the inferred non-match training labels including pairs of records from the collection of records, each pair of records having a non-match label;
    (f) training, using the software code executing in the processor, a pair-wise classifier using the inferred non-match training labels; and
    (g) generating, using the software code executing in the processor, a new proposed cluster membership for each record in the collection of records using the trained pair-wise classifier and the revised verified cluster memberships, thereby producing a record clustering.

9. The method of claim 8 wherein step (f) further uses training labels provided by an operator.

10. The method of claim 9 wherein the training labels provided by the operator take precedence over the inferred non-match training labels.

11. The method of claim 8 wherein step (g) is performed by the software code executing in the processor:
 (i) using a pair generation method to transform the collection of records into a collection of pairs of records, and
 (ii) using the trained pair-wise classifier to predict whether each pair of records is a match or non-match, and
 (iii) running a clustering algorithm on the pairs of records with predictions from the pair-wise classifier and the revised verified cluster memberships to generate the proposed cluster membership for each record in the collection of records.

12. The method of claim 8 wherein step (d)(ii) stores a log of the previous current cluster memberships only for those records in the collection of records whose revised current cluster membership differs from its previous current cluster membership.

13. The method of claim 8 wherein in step (e), the inferred non-match training labels are created by examining each cluster with at least one verified member, and for each cluster with at least one verified member,
 (i) selecting a first sample of the records whose current cluster membership is in the cluster with at least one verified member, and that have at least one previous current cluster membership in the cluster membership log that is different from the cluster with at least one verified member, and for each of the records in the first sample,
  (A) selecting a second sample of the records in the cluster membership log whose previous current cluster membership was the same as that of the record in the first sample, and whose revised current cluster membership is different from that of the record in the first sample, and
  (B) forming pairs with non-match labels from the record in the first sample and the records in the second sample, and
 (ii) selecting a sample of the formed pairs.

14. The method of claim 8 wherein in step (a) some of the current cluster memberships may also be verified cluster memberships with verification mode, and
 wherein in step (c) indicating, via the interface, for a record in the subset of the collection of records, whether the record is a member of a cluster, and if so, whether the verification mode should be locked, suggested or movable, thereby resulting in a revised current cluster membership and a revised verified cluster membership including verification mode for the record, and
 wherein in step (g) the record clustering is produced by generating, using the software code executing in the processor, a new proposed cluster membership for each record in the collection of records using the trained pair-wise classifier and the revised verified cluster memberships including verification mode.

15. The method of claim 8 wherein in step (b) the interface is a user interface display.

16. An apparatus for record clustering, wherein the record clustering is performed on a collection of records, where each record in the collection has (i) a current cluster membership, and (ii) a proposed cluster membership, in which some of the current cluster memberships may also be verified cluster memberships, the apparatus comprising:
 (a) an interface configured to:
  (i) request a subset of the collection of records and their respective current, proposed, and verified cluster memberships, and
  (ii) indicate for a record in the subset of the collection of records, whether the record is a member of a cluster, thereby resulting in a revised current cluster membership and a revised verified cluster membership for the record;
 (b) memory configured to store for each record in the collection of records, the revised current cluster membership and the revised verified cluster membership;
 (c) a pair-wise classifier; and
 (d) software code executing in a processor configured to:
  (i) create inferred match training labels from the revised current cluster memberships and the revised verified cluster memberships, the inferred match training labels including pairs of records from the collection of records, each pair of records having a match label,
  (ii) train the pair-wise classifier using the inferred match training labels, and
  (iii) generate a new proposed cluster membership for each record in the collection of records using the trained pair-wise classifier and the revised verified cluster memberships, thereby producing a record clustering.

17. The apparatus of claim 16 wherein the training of the pairwise classifier further uses training labels provided by an operator.

18. The apparatus of claim 17 wherein the training labels provided by the operator take precedence over the inferred match training labels.

19. The apparatus of claim 16 wherein the software code executing in the processor for generating the new proposed cluster membership:
 (i) uses a pair generation method to transform the collection of records into a collection of pairs of records, and
 (ii) uses the trained pair-wise classifier to predict whether each pair of records is a match or non-match, and
 (iii) runs a clustering algorithm on the pairs of records with predictions from the pair-wise classifier and the revised verified cluster memberships to generate the proposed cluster membership for each record in the collection of records.

20. The apparatus of claim 16 wherein the software code executing in the processor for creating the inferred match training labels examines each cluster with at least one verified member, and for each cluster with at least one verified member,
 (i) selects a sample of the records whose current cluster membership is the cluster with at least one verified member,
 (ii) forms pairs with match labels from the selected sample of records, and
 (iii) selects a sample of the formed pairs.

* * * * *